July 17, 1951 E. E. EICKMEYER ET AL 2,560,853
SELF-COILING FLEXIBLE HOSE FOR DISPENSING PUMPS
Filed April 27, 1948 2 Sheets-Sheet 1
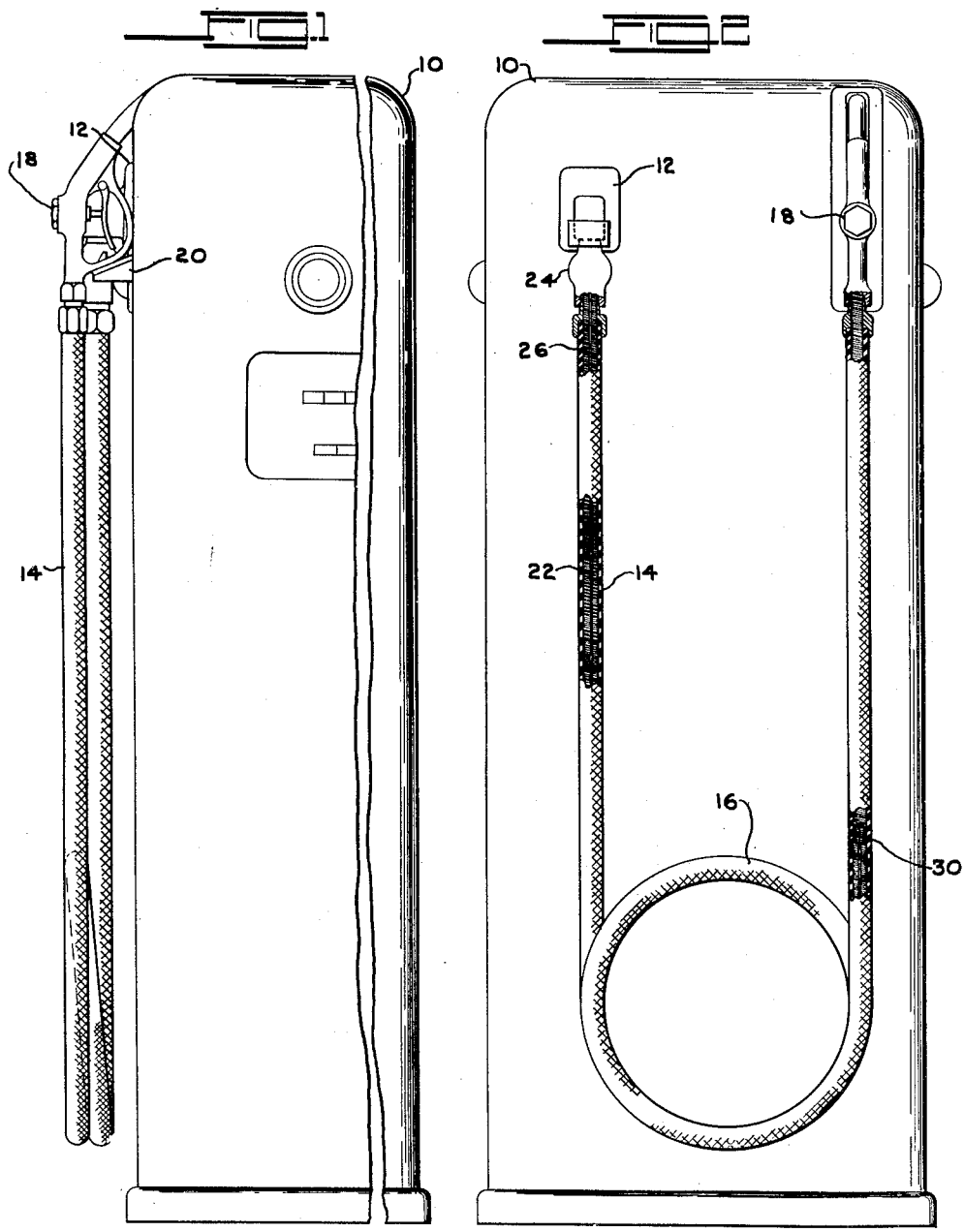
INVENTORS
EARL E. EICKMEYER
HOWARD E. BUTLER
BY Toulmin & Toulmin
ATTORNEYS

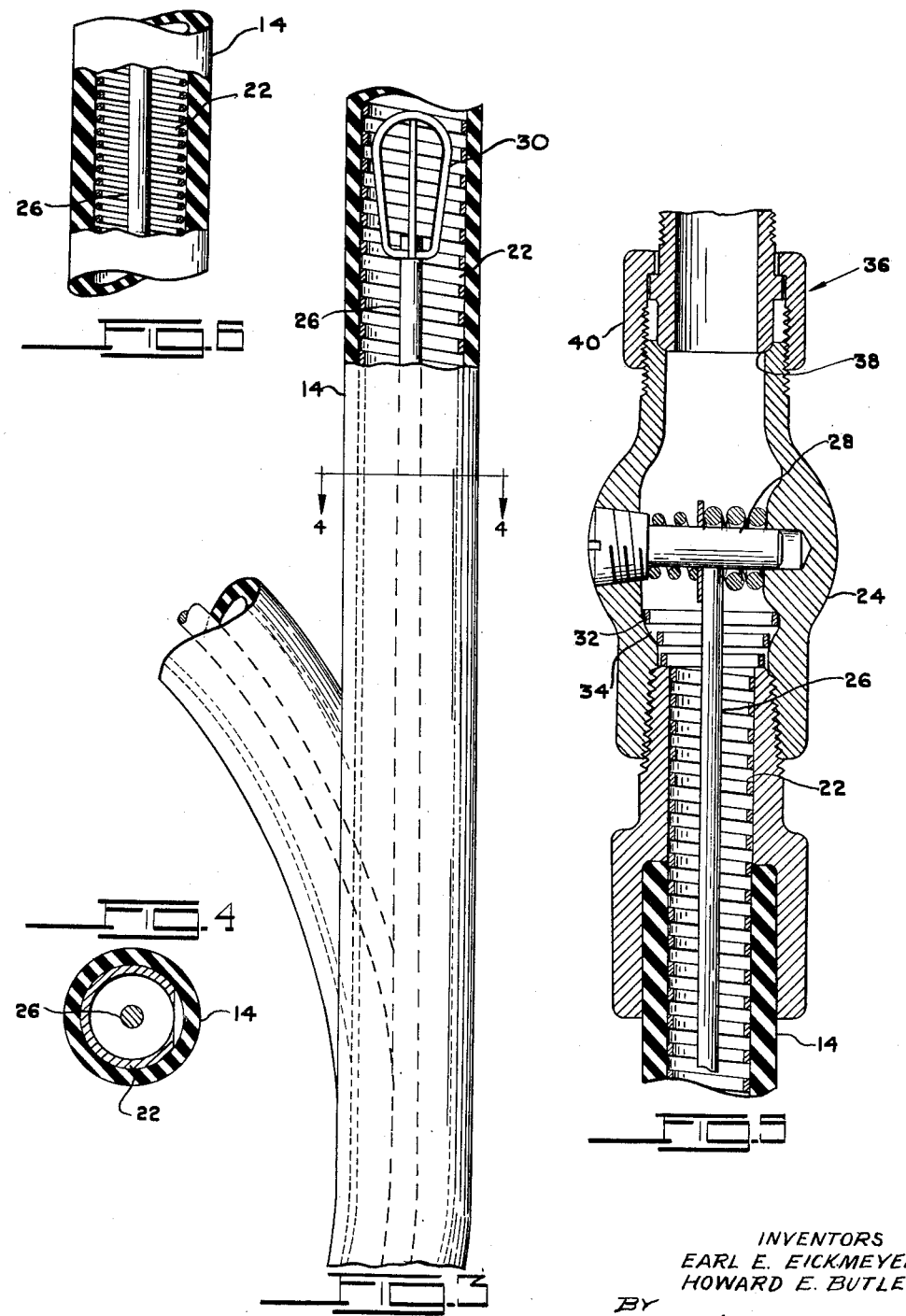

Patented July 17, 1951

2,560,853

UNITED STATES PATENT OFFICE 2,560,853

SELF-COILING FLEXIBLE HOSE FOR DISPENSING PUMPS

Earl E. Eickmeyer and Howard E. Butler, Dayton, Ohio, assignors to The Dayton Pump and Manufacturing Company, Dayton, Ohio, a corporation of Ohio Application April 27, 1948, Serial No. 23,504

3 Claims. (Cl. 174—47)

This invention relates to dispensing pumps of the type usually found in service stations, and is particularly concerned with increasing the effective length of the hose thereof.

In connection with present day dispensing pumps of the type with which this application is generally concerned, it is found that, due to improved design and greater compactness of the units, the length of the hose which will hang between the hose outlet and the nozzle hook at the side of the pump is often insufficient for properly servicing vehicles.

The primary object of the present invention is to provide a means for increasing the effective length of such a hose so that substantially any car, truck, or other vehicle can be adequately serviced.

Heretofore it has been attempted to supply additional length of dispensing hose by winding it on reels within the pump or by having loops thereof hanging within the pump, but this is generally not to be preferred because of the bulk and expense attendant with such a construction.

Other means have been provided whereby an additional length of hose is provided outside the pump in the form of a loop or coil in the hose or in a portion thereof festooned from a suitable hanger on the pump.

These arrangements also have disadvantages inasmuch as ordinarily the means for causing the hose to hang in a loop outside the pump also tends to cause the hose to kink when it is pulled out for use.

The arrangement wherein an extra length of hose is formed by festooning the hose over a hanger in the center of the pump requires that the portion of the hose engaged by the hanger be reinforced to prevent abrasion and wear of the hose.

It is also, therefore, an object of this invention to provide a means for increasing the effective length of the dispensing hose of a pump which overcomes the foregoing difficulties.

A still further object is the provision of a very simple and effective arrangement for increasing the effective length of the hose of a dispensing pump and which has no tendency to cause the hose to kink when drawn out for use.

These and other objects and advantages will become more apparent upon reference to the following description taken in connection with the accompanying drawings in which:

Figures 1 and 2 are side and front views of a dispensing pump having a hose thereon according to this invention;

Figure 3 is a fragmentary view of a hose showing the arrangement of this invention more in detail;

Figure 4 is a plan section indicated by the line 4—4 on Figure 3;

Figure 5 is a sectional view taken at the pump end of the hose; and

Figure 6 is a fragmentary view showing a modified arrangement.

Referring to the drawings more in detail, the dispensing pump is indicated at 10 and comprises a fluid outlet in the form of a fitting designated at 12. Secured to the fitting 12 is a flexible dispensing hose 14 which hangs in one or more coils or convolutions as at 16 adjacent the bottom of the pump and terminates at its other end in the usual form of nozzle 18 which is suspended, when the hose is not in use, on a nozzle hook arrangement as at 20.

According to this invention, there is placed within the dispensing hose a coil spring 22 which may be flat as shown in Figure 3 or which may be round as shown in Figure 6. This coil spring is preferably drawn into the hose after the hose has been manufactured and extends completely therethrough and into physical contact with the fitting 24 at the pump end of the hose and the nozzle 18 at the nozzle end of the hose.

The coil spring 22 provides the dual functions of effecting electrical contact between the nozzle and the aforementioned fitting whereby the additional ground wire usually formed in hoses of this type can be eliminated and also serves to prevent abrasion of the inside of the hose by the end of the stiff torsion spring member 26.

The torsion spring member 26, as will be seen in Figures 2 and 5, has its pump end coiled around a pin 28 which traverses the fitting 24. The torsion spring 26 extends from the pin 28 through the hose around the coil or convolution 16 therein and terminates in a cage member 30 in the straight portion of the hose between the convolutions therein and the nozzle end thereof. The cage portion 30 is so formed in order not to inhibit fluid flow through the hose but still to present enough area to the inside of the hose that it will not snag on the said hose or on the convolutions of the coil spring therein.

The torsion spring is pre-formed to the shape in which it is desired for the hose to hang before it is placed therein and serves as a means of retaining the coil and convolutions in the hose, but, at the same time, is resilient so that the hose can be stretched out for use. As will be seen in Figure 5, each end of the coil spring 22 has one or more enlarged turns thereon at 32 which extend into enlarged parts 34 in the fitting 24 and the nozzle 18. These enlarged parts retain the spring in position axially and also serve to make good electrical contact with both the fitting and the nozzle, but at the same time permit the hose to twist relative to the nozzle and fitting without being restricted by the said coil spring. Thus, if it is desired to twist the nozzle to a certain angle relative to the fitting 24, the coil spring rather than restricting this movement of the nozzle will slip in one or both the nozzle and fitting and thus prevent kinking of the hose.

To this end it is preferable that the coil spring be drawn through the hose after it is formed rather than molded therein during the manufacture of the hose. It will be apparent, however, that the function of the coil spring within the hose, so far as providing resistance to abrasion, will be adequately carried out if it is molded therein. This invention thus comprehends both manners of placing the coil spring within the hose.

Inasmuch as it is desirable for the coils or convolutions in the hose at 16 to lie substantially flat against the side of the pump, it is preferable that the fitting 24 be connected with the fitting 12 by means of the union indicated at 36. This union comprises the ground end parts 38 on the fittings 12 and 24 which meet in sealing engagement and the nut 40 which clamps the two fittings together. This arrangement permits angular adjustment of the fitting 24 in order to cause the coil 16 to lie flat against the pump.

It will be understood that this invention is susceptible to modification in order to adapt it to different usages and conditions and, accordingly, it is desired to comprehend such modifications within this invention as may fall within the scope of the appended claims.

We claim:

1. A flexible fluid dispensing hose including in combination, a flexible dispensing hose having an electrically conductive connection fitting at each end thereof, a coil spring liner in said hose extending from end to end thereof and in electrical contact with both said fittings, a torsion spring member extending axially along said hose and operable to cause said hose to hang in one or more coils when suspended from said fittings, a pin traversing one of said fittings and forming an anchor for one end of said spring member, said spring member terminating at its other end between said coils and said other fitting in free condition, and a cage member on the said free end of said spring whereby the said end is prevented from snagging against the inside of said hose.

2. A flexible fluid dispensing hose including in combination, a flexible dispensing hose having an electrically conductive connection fitting at each end thereof, a coil spring liner in said hose extending from end to end thereof and in electrical contact with both said fittings, enlarged annular recesses in said fittings, enlarged end coils on said liner disposed in said recesses to retain said liner in position, a torsion spring member extending axially along said hose and operable to cause said hose to hang in one or more coils when suspended from said fittings, a pin traversing one of said fittings and forming an anchor for one end of said spring member, said spring member terminating at its other end between said coils and said other fitting in free condition, and a cage member on the said free end of said spring whereby the said end is prevented from snagging against the inside of said hose.

3. A flexible fluid dispensing hose including in combination, a flexible dispensing hose having an electrically conductive connection fitting at each end thereof, a coil spring liner in said hose extending from end to end thereof freely rotatable and extensible therein and in electrical contact with both said fittings, enlarged annular recesses in said fittings, enlarged end coils on said liner disposed in said recesses to retain said liner in position, a torsion spring member extending axially along said hose and operable to cause said hose to hang in one or more coils when suspended from said fittings, a pin traversing one of said fittings and forming an anchor for one end of said spring member, said spring member terminating at its other end between said coils and said other fitting in free condition, and a cage member on the said free end of said spring whereby the said end is prevented from snagging against the inside of said hose.

EARL E. EICKMEYER.
HOWARD E. BUTLER.

REFERENCES CITED

The following references are of record in the file of this patent:

UNITED STATES PATENTS

| Number | Name | Date |
| --- | --- | --- |
| 301,417 | Wilkinson | July 1, 1884 |
| 527,972 | Hanson | Oct. 23, 1894 |
| 576,702 | Truce | Feb. 9, 1897 |
| 1,009,465 | Bowers | Nov. 21, 1911 |
| 1,783,256 | Miller | Dec. 2, 1930 |
| 1,999,663 | Paige | Apr. 30, 1935 |
| 2,175,662 | Guarnaschelli | Oct. 10, 1939 |
| 2,251,340 | Moore | Aug. 5, 1941 |
| 2,277,864 | Horvath | Mar. 31, 1942 |
| 2,327,475 | Waugh | Aug. 24, 1943 |